US005663127A

United States Patent [19]

Flynn et al.

[11] Patent Number: 5,663,127
[45] Date of Patent: Sep. 2, 1997

[54] PERFLUOROPOLYETHER LUBRICATING COMPOSITIONS

[75] Inventors: Richard M. Flynn, Mahtomedi; John G. Owens, Woodbury, both of Minn.

[73] Assignee: Minnesota Mining and Manufacturing Company, St. Paul, Minn.

[21] Appl. No.: 283,389

[22] Filed: Jul. 29, 1994

[51] Int. Cl.$^6$ .................................. C10M 105/54
[52] U.S. Cl. .................. 508/250; 508/262; 508/268; 508/307; 508/206; 508/386; 508/447; 508/504; 508/516; 508/561; 508/570; 508/582; 428/422
[58] Field of Search ............... 252/54; 508/582, 508/250, 262, 268, 307, 386, 561, 570, 504, 447

[56] References Cited

U.S. PATENT DOCUMENTS

| | | |
|---|---|---|
| 4,094,911 | 6/1978 | Mitsch et al. . |
| 4,268,556 | 5/1981 | Pedrotty . |
| 4,451,646 | 5/1984 | Sianesi et al. . |
| 4,671,999 | 6/1987 | Burguette et al. . |
| 4,721,795 | 1/1988 | Caporiccio et al. . |
| 4,729,924 | 3/1988 | Skorjanec et al. ............ 428/422 |
| 4,746,575 | 5/1988 | Scaretti et al. . |
| 4,803,125 | 2/1989 | Takeuchi et al. . |
| 4,803,130 | 2/1989 | Skorjanec et al. ............ 428/336 |
| 5,039,432 | 8/1991 | Ritter et al. . |
| 5,049,410 | 9/1991 | Johary et al. . |
| 5,112,662 | 5/1992 | Ng ............................... 428/64 |
| 5,162,384 | 11/1992 | Owens et al. . |
| 5,290,846 | 3/1994 | Tuminello . |
| 5,292,585 | 3/1994 | Ohnuki et al. ................. 428/336 |
| 5,352,785 | 10/1994 | Herzberg et al. .............. 544/178 |
| 5,358,719 | 10/1994 | Mellul et al. .................. 424/497 |
| 5,401,429 | 3/1995 | Flynn et al. .................... 252/171 |
| 5,468,552 | 11/1995 | Ohnuki et al. ................. 428/336 |

FOREIGN PATENT DOCUMENTS 0 492 823 A2   2/1991   European Pat. Off. .

OTHER PUBLICATIONS

Ausimont, Product Data sheet, Fomblin® Z–Tetraol, Ausimont USA, Inc. Date Unavailable.
Performance Fluids for Applications in the Disk Media Industry, Frank W. Klink, Ph.D., 3M Specialty Chemicals Division, Feb. 25, 1993.
Lubrication Process for Magnetic Disks, Research Disclosure—p. 540, Jul. 1991.

*Primary Examiner*—Jacqueline V. Howard
*Attorney, Agent, or Firm*—Gary L. Griswold; Walter N. Kirn; John A. Burtis

[57] ABSTRACT

A lubricating composition containing about 0.1–10 weight percent of a perfluoropolyether lubricant containing perfluoropolyether molecules having at least one hydrogen-containing end group per molecule, and about 99.9–90 weight percent of a liquid, perfluorinated, nonaromatic cyclic organic solvent or mixture of such solvents is provided.

20 Claims, No Drawings

PERFLUOROPOLYETHER LUBRICATING COMPOSITIONS

FIELD OF THE INVENTION

This invention relates to a method of lubricating magnetic media, video and audio tapes, using perfluoropolyether lubricant and a perfluorinated compound as a solvent. In another aspect, this invention relates to lubricant coating compositions useful in such method.

BACKGROUND OF THE INVENTION

Typically, perfluoropolyether lubricants are chemically inert, thermally stable, moisture repellant compositions that possess relatively low surface tension, good lubricity and low volatility. As a result, they are effective and long-lasting lubricants for a variety of substrates such as magnetic media, precision mechanical instruments, and electrical contacts. Because thick coatings on a recording or reading surface of a data hard disk may lead to output losses, lubricant coatings on such substrates are generally applied to the substrate in the form of a dilute solution. After application, the coating is dried to yield a thin, uniform lubricant coating.

Various perfluoropolyether lubricants have been described (see, for example, U.S. Pat. No. 4,721,795 (Caporiccio et at.)) and many are commercially available (e.g., from Montedison S.p.A of Milan, Italy under the "FOMBLIN" tradename and from E. I. DuPont de Nemours & Company under the "KRYTOX" tradename). Many perfluoropolyether lubricants are a mixture of perfluoropolyether molecules of various molecular weights and structures. Some perfluoropolyether lubricants contain perfluoropolyether molecules having end groups that are thought to become fixed to, or immobilized on, the substrate during deposition and use.

One particularly preferred solvent commonly used with perfluoropolyether lubricants is 1,1,2-trichloro-1,2,2-trifluoroethane. It is a good perfluoropolyether solvent and relatively volatile, so it can be readily removed from the coating by drying the coating. However, chlorofluorocarbon liquids are no longer favored solvents for such uses because such compounds are believed to deplete ozone in the earth's atmosphere. See, for example, *Chem. & Eng. News*, Nov. 15, 1993, pages 12–18.

Certain perfluorinated alkane liquids have been used instead of chlorofluorocarbon liquids as perfluoropolyether solvents. For example, U.S. Pat. No. 5,049,410 (Johary et al.) states that "FG-72" from Minnesota Mining and Manufacturing (St. Paul, Minn.) is a suitable liquid carrier for perfluorinated lubricants. This FLUORINERT™ perfluorinated fluid (more appropriately referred to as "FC-72") and Performance Fluid PF-5060 are acylic perfluorinated alkanes available from Minnesota Mining and Manufacturing. They are good solvents for many perfluoropolyether lubricants; however, it has been determined that they will not dissolve all components of some perfluoropolyether lubricants, particularly lubricants containing perfluoropolyether molecules having hydrogen-containing end groups, e.g., terminal neutral planar groups such as those described in U.S. Pat. No. 4,721,795 (Caporiccio et al. ). The limited solubility of such perfluoropolyether lubricants in acylic, perfluorinated alkanes results in hazy lubricant coating compositions and nonuniform coatings upon application to a substrate.

Thus, what is needed are solvents that are useful for a wide variety of perfluoropolyether lubricants, particularly those containing perfluoropolyether molecules having hydrogen-containing end groups, and are more environmentally acceptable.

SUMMARY OF THE INVENTION

The present invention provides a perfluoropolyether lubricant coating composition and a method of lubricating a substrate. The coating composition includes a perfluoropolyether lubricant and a liquid, perfluorinated, nonaromatic cyclic organic solvent, which may be substituted or nonsubstituted, or a mixture of such solvents. In these compositions, the solvent is the major component (by weight). As used herein, the phrase "perfluorinated" means that all or essentially all of the hydrogen atoms in an organic compound are replaced by fluorine atoms. The phrase "nonaromatic cyclic organic solvent" includes within its scope alicyclic compounds, e.g., cycloalkanes and cycloalkenes, as well as heterocyclic compounds, i.e., heteroatom-containing cyclic molecules, but not aromatic compounds. Preferred solvents have one or two rings with 4–7 members and contain 5–20, more preferably 5–12, carbon atoms (total number of carbon atoms in the ring and in any substituents).

A particularly preferred group of such solvents include 5- or 6-membered perfluorinated N-aliphatic cyclic 1,3- or 1,4-aminoethers, 5- or 6-membered perfluorinated N-aliphatic cyclic amines, perfluorinated cycloalkanes or cycloalkenes containing one or two 4-, 5-, or 6-membered rings, and mixtures thereof. Of these, the most preferred compounds are perfluorinated N-aliphatic morpholines. Preferred examples of these classes of solvents are perfluoro-N-methyl morpholine, perfluoro-N-ethyl morpholine, perfluoro-N-isopropyl morpholine, perfluoro-N-methylpiperidine, perfluorodecalin, perfluorodimethylcyclobutane, perfluoro-N-methylpyrrolidine, perfluoromethylcyclohexane, perfluorocyclohexene, and mixtures thereof. Of these, the most preferred compounds are perfluoro-N-methyl morpholine, perfluoro-N-ethyl morpholine, perfluoro-N-isopropyl morpholine, and mixtures thereof.

The coating composition of the present invention includes about 0.1–10 weight percent, and preferably about 0.2–5 weight percent, of a perfluoropolyether lubricant and about 99.9–90 weight percent, and preferably about 99.8–95 weight percent, of a liquid, perfluorinated, nonaromatic cyclic organic solvent. The method includes the steps of: (1) applying to the surface to be lubricated, the perfluoropolyether lubricant coating composition of the invention; and (2) subsequently drying the coating to remove the perfluorinated solvent.

The perfluorinated solvents used in the present invention are surprisingly better perfluoropolyether lubricant solvents than the perfluorinated acyclic solvents used in the prior art. As a result, for example, certain preferred perfluoropolyether lubricant coating compositions of this invention, particularly those containing perfluoropolyether molecules having at least one hydrogen-containing end group per molecule, possess significantly lower haze levels than prior art perfluoropolyether lubricant coating compositions prepared using perfluorinated acyclic alkane solvents.

DETAILED DESCRIPTION OF THE INVENTION

The perfluoropolyether lubricants useful in this invention include any perfluoropolyether or poly(perfluoroalkylene oxide) composition useful as a lubricant. Many of the perfluoropolyether lubricants useful in the invention have been described. For example, some perfluoropolyether lubricants useful in this invention are described in U.S. Pat. Nos. 4,671,999 (Burguette et al.), 4,268,556 (Pedrotty), 4,803,125 (Takeuchi et al.), 4,721,795 (Caporiccio et al.), 4,746,575 (Scaretti et al.), and 4,094,911 (Mitsch et al.), which descriptions are hereby incorporated by reference.

Typically, the perfluoropolyether lubricants contain primarily perfluoropolyether molecules. These lubricants are typically liquid at room temperature. Such lubricating liquids, i.e., fluids, can have a wide range of viscosities. For example, useful lubricants can be in the form of a viscous oil. As used herein, "perfluoropolyether" molecules have oxygen atoms in the backbone. Generally, there are few, if any side chains; however, if there are side chains they do not contain oxygen atoms and are perfluoroalkyl side chains, such as —$CF_3$ side chains. Such molecules provide a lubricant that is sufficiently mobile such that when used as a coating on a data disk any tracks in the lubricant created by a head, for example, are self-filling. The molecules may have varying molecular weights and end groups but are characterized by backbones composed of one or more of the repeating units $-(C_aF_{2a}O)-$in which a $=1-8$, preferably a $=1-4$, randomly distributed in the backbone. These repeating units can be linear or branched, as in the following structure:

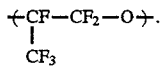

The molecular weight of the perfluoropolyether lubricant should be high enough that the molecules are not "spun off" during use of the coated substrate or volatized from the coating during use.

The perfluoropolyether molecules of the lubricant contain end groups, which can be the same or different. Such end groups are generally organic groups that have from 1 to 20 carbon atoms. They can contain heteroatoms, such as oxygen, nitrogen, and sulfur, for example, and can be substituted with one or more halogen atoms, such as fluorine, for example. As used herein, the "end groups" are the terminal groups attached to the repeating units $-(C_aF_{2a}O)-$in the perfluoropolyether backbone, e.g., groups A and A' in formula I shown below. Preferred perfluoropolyether lubricants contain a major amount of perfluoropolyether molecules having at least one hydrogen-containing end group per molecule. These preferred perfluoropolyether lubricants can also contain a minor amount of molecules having only nonhydrogen-containing end groups. Furthermore, these preferred perfluoropolyether lubricants can include mixtures of molecules containing one and two hydrogen-containing end groups. More preferred perfluoropolyether lubricants contain a major amount of molecules having two hydrogen-containing end groups per molecule. These more preferred perfluoropolyether lubricants can also contain a minor amount of molecules having only one hydrogen-containing end group, and in some instances they can contain a minor amount of molecules having only nonhydrogen-containing end groups.

Exemplary nonhydrogen-containing end groups are —$CF_2CF_3$, —$C(O)F$, —F, —$CF_3$, —$OCF_3$, and the like. Typically, useful perfluoropolyether molecules with two nonhydrogen-containing end groups have number average molecular weights as high as 10,000, while useful perfluoropolyether molecules with at least one hydrogen-containing end group per molecule have number average molecular weights of less than about 5000.

The liquid, perfluorinated, nonaromatic cyclic organic compounds used as lubricant solvents in this invention are particularly effective solvents for perfluoropolyether molecules having hydrogen-containing end groups (i.e., at least one such end group per molecule) such as the neutral planar end groups of the following structure:

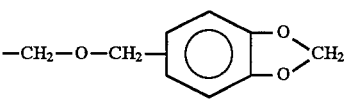

That is, when liquid, perfluorinated, cyclic organic solvents are used to prepare perfluoropolyether lubricant coating compositions, particularly those containing perfluoropolyether molecules with at least one hydrogen-containing end group per molecule, the compositions are nonhazy and uniform. That is, the lubricant coating compositions of the present invention preferably have a turbidity of less than about 30% haze, more preferably less than about 20% haze, and most preferably less than about 10% haze, as determined by the method described in the examples. In contrast, coating compositions prepared from lubricants containing such perfluoropolyether molecules and acyclic perfluoroalkanes tend to be quite hazy (i.e., with a turbidity greater than about 40% haze) and result in somewhat nonuniform perfluoropolyether lubricant coatings. This is a particular problem when such lubricants have a number average molecular weight of less than about 2000.

Preferably, the perfluoropolyether lubricants used in this invention consist or consist essentially of perfluoropolyether molecules represented by the formula:

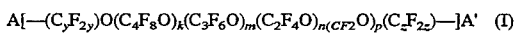

where, in the above formula, y=0–20, z=0–20, and k, m, n, and p are the same or different, and range from 0 to about 200. The repeating units may be randomly distributed in the backbone of the molecule. The sum of k, m, n, and p is greater than two and typically less than about 200. Each of the groups $C_yF_{2y}$, $C_zF_{2z}$, $C_4F_8O$, $C_3F_6O$, and $C_2F_4O$ can be linear or branched.

The A and A' groups are the same or different and are selected from the group consisting of hydrogen-containing or nonhydrogen-containing monovalent organic groups. Nonhydrogen-containing A and A' groups are, for example, —$CF_2CF_3$, —$CF_3$, —F, —$OCF_2CF_3$, —$OCF_3$, —$CF_2C(O)$F, and —$C(O)F$. An example of a perfluoropolyether with nonhydrogen-containing end groups is:

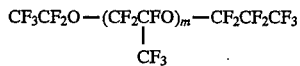

(wherein m is an integer having a value such that the lubricant has a number average molecular weight in the range of 1000 to 5000, an example of such a compound is commercially available as KRYTOX 142 from E. I. DuPont deNemours & Company of Wilmington, Del. Other nonhydrogen-containing perfluoropolyether lubricants useful in this invention are available commercially, for example, from Montedison S.p.A. of Milan, Italy as certain types of "FOMBLIN" fluids such as FOMBLIN-Z and from Dalkin Industries, Ltd. of Tokyo, Japan as certain types of "DEMNUM" fluids.

Examples of hydrogen-containing A and A' groups are alkyl, aryl, and alkaryl groups, which can be partially substituted with fluorine atoms and can contain heteroatoms, such as oxygen, sulfur, and nitrogen, for example. Particularly useful examples of such hydrogen-containing end groups include:

(a) —B—D groups wherein:
(i) B is: —CH$_2$O—, —CH$_2$—O—CH$_2$—, —CF$_2$— and —CF$_2$O—; and
(ii) D is:

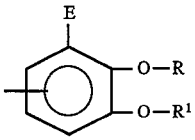

or

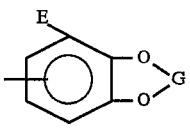

wherein, R and R$^1$ are independently alkyl groups having 1 to 3 carbon atoms; G is a divalent alkyl group having 1 to 5 carbon atoms; and E is —H, —OH, —OCH$_3$, —OC$_2$H$_5$, or —OC$_3$H$_7$ (each R, R$^1$, and G group can be substituted with one or more halogen atoms);

(b) —(C$_t$H$_{2t}$)SH, —(C$_t$H$_{2t}$)SR$^2$, —(C$_t$H$_{2t}$)NR$^2{}_2$, —CO$_2$R$^2$, —(C$_t$H$_{2t}$)CO$_2$H, —(C$_t$H$_{2t}$)SiR$^2{}_zQ_{3-z}$, —(C$_t$H$_{2t}$)CN, —(C$_t$H$_{2t}$)NCO, —(C$_t$H$_{2t}$)CH=CH$_2$,

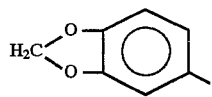

—(C$_t$H$_{2t}$)CO$_2$R$^2$, —(C$_t$H$_{2t}$)OSO$_2$CF$_3$, —(C$_t$H$_{2t}$)OC(O)Cl, —(C$_t$H$_{2t}$)OCN, —(O)COC(O)—R$^2$, —(C$_t$H$_2$X, —CHO, —(C$_t$H$_{2t}$)CHO, —CH(OCH$_3$)$_2$, —(C$_t$H$_{2t}$)CH(OCH$_3$)$_2$, —(C$_t$H$_{2t}$)SO$_2$Cl, —C(OCH$_3$)=NH, —C(NH$_2$)=NH, —(C$_t$H$_{2t}$)OC(O)CH=CH$_2$, —(C$_t$H$_{2t}$)OC(O)C(CH$_3$)=CH$_2$,

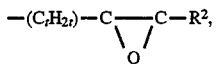

—(C$_t$H$_{2t}$)OR$^2$, —(C$_t$H$_{2t}$)OC(O)R$^2$, —(C$_t$H$_{2t}$)O(C$_t$H$_{2t}$O)$_x$H,

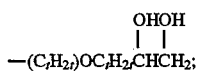

; wherein Q is —OH, —OR$^3$, —H, —Cl, —F, —Br, or —I; R$^2$ is hydrogen, an aryl group containing 6–10 carbons, or an alkyl group containing 1–4 carbons; R$^3$ is an alkyl group containing 1–4 carbons; X is Cl, Br, F, or I; z is 0–2; x is 1–10; v is 0–1; and t is 1–4;

(c) —OCR$^4$R$^5$R$^6$, wherein R$^4$ is hydrogen, an alkyl or fluoroalkyl group containing 1–4 carbons; R$^5$ is hydrogen or an alkyl group containing 1–4 carbons; and R$^6$ is fluoroalkyl group containing 1–4 carbon atoms; and

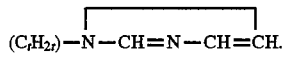

Specific examples of particularly preferred perfluoropolyethers having functional end groups according to formula I include:

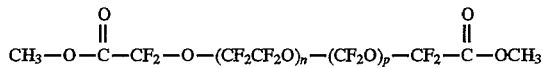

wherein n and p are integers, each having an independent value such that the lubricant has a number average molecular weight in the range of 1000 to 5000 (an example of such a compound is commercially available as FOMBLIN Z-DEAL from Montedison S.p.A. (Milan, Italy));

(b)

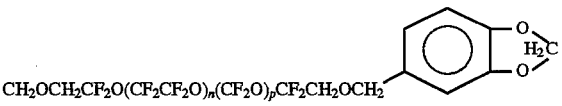

wherein n and p are integers, each having an independent value such that the lubricant has a number average molecular weight in the range of 1000 to 5000 (an example of such a compound is commercially available as FOMBLIN AM 2001 from Montedison S.p.A. (Milan, Italy));

(c)

HOCH$_2$—CF$_2$—O—(CF$_2$CF$_2$O)$_n$—(CF$_2$O)$_p$—CF$_2$—CH$_2$OH wherein n and p are integers, each having an independent value such that the lubricant has a number average molecular weight in the range of 1000 to 5000 (an example of such a compound is commercially available as FOMBLIN Z-DOL from Montedison S.p.A. (Milan, Italy));

(d)

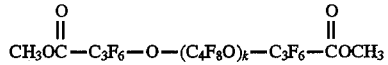

wherein k is an integer having a value such that the lubricant has a number average molecular weight in the range of 1000 to 5000;

(e)

HOCH$_2$—C$_3$F$_6$—O—(C$_4$F$_8$O)$_k$—C$_3$F$_6$—CH$_2$OH wherein k is an integer having a value such that the lubricant has a number average molecular weight in the range of 1000 to 5000;

(f)

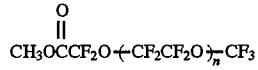

wherein n is an integer having a value such that the lubricant has a number average molecular weight in the range of 1000 to 5000;

(g)

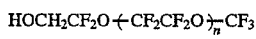

wherein n is an integer having a value such that the lubricant has a number average molecular weight in the range of 1000 to 5000;

(h)

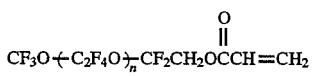

wherein n is an integer having a value such that the lubricant has a number average molecular weight in the range of 1000 to 5000;

(i)

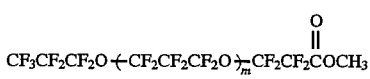

wherein m is an integer having a value such that the lubricant has a number average molecular weight in the range of 1000 to 5000 (an example of such a compound is commercially available as DEMNUM ester from Daikin Industries, Ltd.);

(j)

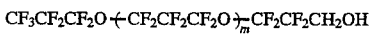

wherein m is an integer having a value such that the lubricant has a number average molecular weight in the range of 1000 to 5000 (an example of such a compound is commercially available as DEMNUM alcohol from Daikin Industries, Ltd.);

(k)

OCNCH$_2$—CF$_2$—O—(CF$_2$CF$_2$O)$_n$—(CF$_2$O)$_p$—CF$_2$—CH$_2$NCO wherein n and p are integers, each having an independent value such that the lubricant has a number average molecular weight in the range of 1000 to 5000 (an example of such a compound is commercially available as FOMBLIN Z-DISOC from Montedison S.p.A. (Milan, Italy));

(l)

H(OH$_4$C$_2$)$_{1.5}$OCH$_2$—CF$_2$—O—(CF$_2$CF$_2$O)$_n$—(CF$_2$O)$_p$—CF$_2$—CH$_2$O(C$_2$H$_4$O)$_{1.5}$H wherein n and p are integers, each having an independent value such that the lubricant has a number average molecular weight in the range of 1000 to 5000 (an example of such a compound is commercially available as FOMBLIN Z-DOL-TX from Montedison S.p.A. (Milan, Italy));

(m)

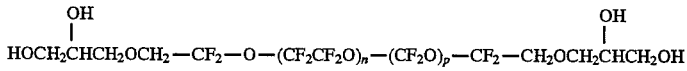

wherein n and p are integers, each having an independent value such that the lubricant has a number average molecular weight in the range of 1000 to 5000 (an example of such a compound is commercially available as FOMBLIN Z-TETRAOL from Montedison S.p.A. (Milan, Italy)); and (n)

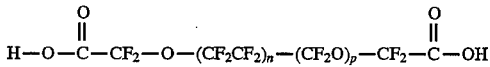

wherein n and p are integers, each having an independent value such that the lubricant has a number average molecular weight in the range of 1000 to 5000 (an example of such a compound is commercially available as FOMBLIN Z-DIAC from Montedison S.p.A. (Milan, Italy)).

Methods of making compounds according to the formulae listed as examples (d)–(h) are described in U.S. Pat. No. 5,039,432 (Ritter et al.).

The perfluorinated, nonaromatic, cyclic organic solvents useful in this invention are good perfluoropolyether solvents. Such solvents include alicyclic compounds, e.g., cycloalkanes and cycloalkenes, as well as heterocyclic compounds, but not aromatic compounds. They are liquids at room temperature, preferably with a useful liquid range that corresponds to the operating temperature of the process in which they are used. They are volatile enough to be substantially evaporated from the lubricant coating during the drying of the coated substrate. Typically, such solvents have boiling points of less than about 175° C. and preferably less than about 100° C. The cyclic solvents contain one or two rings, which may be fused or unfused, having 4 to 7 members. Preferably, such rings have 4 to 6 members. One or more carbon atoms of the ring structures can be replaced with heteroatoms such as nitrogen, sulfur, and oxygen. The ring structures can contain ethylenic unsaturation; however, ethylenically saturated ring structures are generally preferred. The rings can be further substituted with fluorine, perfluoroalkyl, perfluoroalkoxy, or perfluoroaminoalkyl groups. Whether substituted or unsubstituted, preferred solvents have 5–20, more preferably 5–12, carbon atoms (total number of carbon atoms in the ring and in any substituents), all of which have fluorine atoms in place of hydrogen atoms (hence, "perfluorinated").

A particularly useful class of perfluorinated solvents are 5- or 6-membered perfluorinated N-aliphatic cyclic 1,3- or 1,4-aminoethers having the general formula:

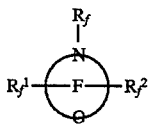

wherein the R$_f$ group attached to the tertiary amino ring atom is a perfluoroaliphatic saturated or unsaturated group, which can be linear or branched, having from 1 to 4 carbon atoms. Examples of such groups include, for example, —CF$_3$, —CF$_2$CF$_3$, —C(CF$_3$)$_3$ and —CF(CF$_3$)CF$_3$. R$_f^1$ and R$_f^2$ are, independently, a fluorine atom or a perfluoroaliphatic saturated or unsaturated group having from 1 to 4 carbon atoms.

These compounds contain a total carbon atom content of no greater than 12, and preferably no greater than 8, carbon atoms. The designation "F" in the ring is a conventional symbol that denotes the saturated ring is fully fluorinated. That is, all ring carbon atoms are bonded to fluorine atoms, except as depicted.

Suitable examples of groups of compounds that fall within this class are perfluorinated N-aliphatic morpholines, perfluorinated N-alkyl-2,5-aliphatic-substituted-1,3-oxazolidines, perfluorinated N-alkyl-2,5-aliphatic-substituted-1,3-oxazines, the structures of which are as follows:

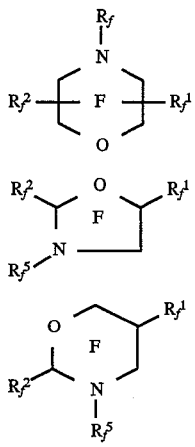

wherein $R_f$ is a perfluoroaliphatic group, saturated or unsaturated, which can be linear or branched having from 1 to 4 carbon atoms, $R_f^5$ is a perfluoroalkyl group having from 1 to 4 carbon atoms, and $R_f^1$ and $R_f^2$ are as defined above. Such compounds are described in U.S. Pat. No. 5,162,384 (Owens et al.).

The perfluorinated N-aliphatic morpholines useful in the present invention are commercially available or known in the literature. The perfluorinated oxazolidines and oxazines useful in the present invention can be prepared by electrochemical fluorination of hydrocarbon or partially fluorinated precursors. Generally, the precursors used are perfluorinatable, N,N-dialkyl carboxamides. A mixture of perfluorinated, aliphatic-substituted 2-dialkylaminotetrahydrofuran and perfluorinated, aliphatic-substituted 2-dialkylaminodihydropyran may also be present in the mixture of oxazolidines and oxazines. The process for preparing oxazolidines and oxazines from perfluorinatable, N,N-dialkyl carboxamides is described in European Patent Application 0 492 823 A2 (Minnesota Mining and Manufacturing), which is incorporated herein by reference.

Another class of useful perfluorinated solvents are 5- or 6-membered perfluorinated t-amino cyclic ethers, such as the perfluorinated, aliphatic substituted, 2-dialkylaminotetrahydrofurans and the perfluorinated, aliphatic substituted, 2-dialkylaminodihydropyrans, which have the general formulae:

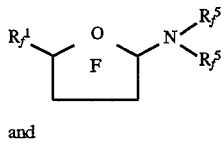

and

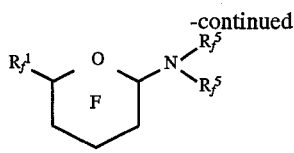

wherein $R_f^5$ and $R_f^1$ are as defined above and each $R_f^5$ can be the same or different. Such compounds are described in EP Patent Application 0 492 823 A2 (Minnesota Mining and Manufacturing Company), which is incorporated herein by reference.

Yet another useful class of perfluorinated solvents are perfluorinated 5- or 6-membered N-aliphatic cyclic amines having the general formula:

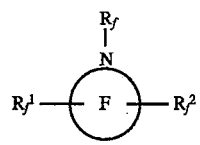

wherein $R_f$, $R_f^1$, and $R_f^2$ are as defined above. A particularly preferred example of such a compound is perfluoro-N-methylpyrrolidine.

Still another useful class of perfluorinated solvents are perfluorinated cycloalkanes or cycloalkenes having one or two 4-, 5-, or 6-membered rings. These rings can be optionally substituted with one or more perfluorinated alkyl groups containing 1–4 carbon atoms or alkoxy groups containing 1–4 carbon atoms. Particularly preferred examples of such compounds include perfluorodecalin, perfluorodimethylcyclobutane, perfluorocyclohexene, and perfluoromethylcyclohexane.

Of these classes of compounds, the solvent is preferably selected from the group consisting of 5- or 6-membered perfluorinated N-aliphatic cyclic 1,3- or 1,4-aminoethers, 5- or 6-membered perfluorinated N-aliphatic cyclic amines, perfluorinated cycloalkanes or cycloalkenes containing one or two 4-, 5-, or 6-membered rings, and mixtures thereof. Of these, the most preferred compounds are perfluorinated N-aliphatic morpholines.

In certain preferred embodiments, the perfluorinated solvent is selected from the group consisting of perfluoro-N-methyl morpholine, perfluoro-N-ethyl morpholine, perfluoro-N-isopropyl morpholine, perfluorodecalin, perfluorodimethylcyclobutane, perfluoro-N-methylpyrrolidine, perfluoro-N-methylpiperidine, perfluoromethylcyclohexane, perfluorocyclohexene, and mixtures thereof. In particularly preferred embodiments, the perfluorinated solvent is selected from the group consisting of perfluoro-N-methyl morpholine, perfluoro-N-ethyl morpholine, and perfluoro-N-isopropyl morpholine, and mixtures thereof.

The compositions of the present invention are useful to form thin protective layers on articles to protect against wear caused by contact with other surfaces. Such articles include, for example, computer hard discs, flexible magnetic recording media, precision electrical connectors, gears, porous bushings, sliders, contacts, components of ball or roller bearings, and other articles used in precision applications.

A very thin, uniform coating is typically required for these precision applications. For example, on computer discs, the coating thickness is in the range of about 10 Å. To obtain such a thin coating, the lubricant is dissolved in one of the solvents described herein. The coating composition includes about 0.1–10 weight percent, and preferably about 0.2–5 weight percent, of a perfluoropolyether lubricant is dissolved in about 99.9–90 weight percent, and preferably about 99.8-95 weight percent, of a liquid perfluorinated cyclic aliphatic solvent. The discs are placed into a coating chamber. The lubricating composition is pumped into the coating chamber, covering the discs. The solution is then drained from the chamber at a controlled rate to deposit a uniform coating over the disc surface. The solvent evaporates from the solution leaving the nonvolatile lubricant on the disc surface.

Objects and advantages of this invention are further illustrated by the following examples, but the particular materials and amounts thereof recited in these examples, as well as other conditions and details, should not be construed to unduly limit this invention. All materials are commercially available or known in the literature except where otherwise stated or apparent.

Example 1

Lubricating compositions of this invention were prepared by mixing 0.5% by weight of FOMBLIN AM 2001 perfluoropolyether (having a number average molecular weight of 2490 and a polydispersity greater than about 1.5, available from Montealison S.p.A. of Milan, Italy) into various perfluorinated solvents. The mixtures were agitated for 60 seconds. A Hazegard System "XL-211 Hazegard Hazemeter" (available from Pacific Scientific, Silver Spring, Md.) was used to determine the turbidity of these solutions following the haze measurement procedure outlined in the operator's manual, which is incorporated herein by reference. The Hazegard System determines the turbidity or percent haze of a liquid by passing an incident light beam through a 2 cm×5 cm×7 cm acrylic cell filled with the test solution and measuring the amount of light scattering. The 0 and 100 percent haze values were determined as described in the operator's manual for haze measurement. The percent haze of these solutions were as follows:

| Solvent | Percent Haze |
| --- | --- |
| Perfluoro-N-methyl morpholine | 8.3 |
| Perfluoro-N-ethyl morpholine | 7.3 |
| Perfluoro-N-isopropyl morpholine | 9.8 |
| Perfluorodecalin | 5.1 |
| Perfluorodimethylcyclobutane | 5.2 |
| Perfluoro-N-methylpyrrolidine | 7.1 |
| Perfluorocyclohexene | 0.3 |

Comparative Example 1

In this Comparative Example, lubricating compositions were prepared using other perfluorinated solvents using the procedure of Example 1. These were tested as in Example 1 to determine the turbidity of the solutions. The percent haze of these solutions were as follows:

| Solvent | Percent Haze |
| --- | --- |
| Perfluorohexane | 46.2 |
| Perfluoropentane | 44.6 |
| Perfluorotripropylamine | 48.4 |
| Perfluoro-bis-butoxyethoxymethane | 54.6 |

As can be seen from the data, the lubricating compositions using perfluorinated nonaromatic cyclic organic solvents yield solutions which are much less turbid (less haze) than those prepared using perfluorinated acyclic solvents. Using the method of this invention, a thin, uniform lubricant coating may be prepared on a variety of substrates. By comparison, the hazy solution of the Comparative Example may impart a non-uniform coating to a substrate.

Various modifications and alterations of this invention will become apparent to those skilled in the art without departing from the scope and principles of this invention. It should be understood that this invention is not to be unduly limited to the illustrative embodiments set forth herein.

What is claimed is:

1. A lubricating composition comprising:
   (a) about 0.1–10 weight percent of a perfluoropolyether lubricant containing perfluoropolyether molecules having at least one hydrogen-containing end group per molecule; and
   (b) about 99.9–90 weight percent of a liquid, perfluorinated, nonaromatic cyclic organic solvent or mixture of solvents;
wherein said lubricating composition has a turbidity of less than about 30% haze.

2. The lubricating composition of claim 1 wherein the solvent is a perfluorinated cyclic compound having one or two rings containing 4–7 members.

3. The lubricating composition of claim 2 wherein the perfluorinated cyclic compound is a heterocyclic compound.

4. The lubricating composition of claim 1 wherein the solvent is selected from a group consisting of 5- or 6-membered perfluorinated N-aliphatic cyclic 1,3- or 1,4-aminoethers, 5- or 6-membered perfluorinated N-aliphatic cyclic amines, perfluorinated cycloalkanes or cycloalkenes containing one or two 4-, 5-, or 6-membered rings, and mixtures thereof.

5. The lubricating composition of claim 4 wherein the liquid perfluorinated solvent is selected from the group consisting of perfluoro-N-methyl morpholine, perfluoro-N-ethyl morpholine, perfluoro-N-isopropyl morpholine, perfluorodecalin, perfluorodimethylcyclobutane, perfluoro-N-methylpyrrolidine, perfluoro-N-methylpiperidine, perfluoromethylcyclo-hexane, perfluorocyclohexene, and mixtures thereof.

6. The lubricating composition of claim 5 wherein the liquid perfluorinated solvent is selected from the group consisting of perfluoro-N-methyl morpholine, perfluoro-N-ethyl morpholine, perfluoro-N-isopropyl morpholine, and mixtures thereof.

7. The lubricating composition of claim 1 wherein the perfluoropolyether lubricant is present in an amount of about 0.2–5 weight percent and the liquid, perfluorinated, nonaromatic cyclic organic solvent is present in an amount of about 99.8-95 weight percent.

8. The lubricating composition of claim 1 wherein the perfluoropolyether lubricant contains the perfluoropolyether molecules represented by the formula:

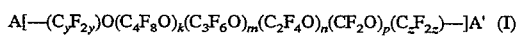

wherein:
   (a) y=0–20;
   (b) z=0–20;
   (c) k, m, n, and p are the same or different, range from 0 to about 200, and the sum of k, m, n, and p is greater than two and typically less than about 200; and
   (d) the A and A' groups are the same or different and are monovalent organic groups, wherein at least one of the A and A' groups is a hydrogen-containing monovalent organic group.

9. The lubricating composition of claim 8 wherein at least one of the A and A' groups is:
(a) a —B—D group wherein:
  (i) B is: —CH₂O—, —CH₂—O—CH₂—, —CF₂— and —CF₂O—; and
  (ii) D is:

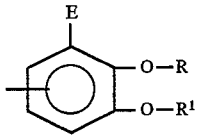

or

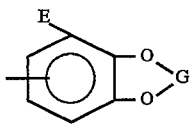

wherein, R and R¹ are independently alkyl groups having 1 to 3 carbon atoms; G is a divalent alkyl group having 1 to 5 carbon atoms; and E is —H, —OH, —OCH₃, —OC₂H₅, or —OC₃H₇;

(b) —(C$_t$H$_{2t}$)SH, —(C$_t$H$_{2t}$)SR², —(C$_t$H$_{2t}$)NR²₂, —CO₂R², —(C$_t$H$_{2t}$)CO₂H, —(C$_t$H$_{2t}$)SiR²$_z$Q$_{3-z}$, —(C$_t$H$_{2t}$)CN, —(C$_t$H$_{2t}$)NCO, —(C$_t$H$_{2t}$) CH=CH₂,

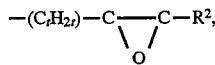

—(C$_t$H$_{2t}$)CO₂R², —(C$_t$H$_{2t}$)OSO₂CF₃, —(C$_t$H$_{2t}$)OC (O)Cl, —(C$_t$H$_{2t}$)OCN, —(O)COC(O)—R², —(C$_t$H$_{2t}$) X, —CHO, —(C$_t$H$_{2t}$)CHO, —CH(OCH₃)₂, —(C$_t$H$_{2t}$) CH(OCH₃)₂, —(C$_t$H$_{2t}$) SO₂Cl, —C(OCH₃)=NH, —C(NH₂)=NH, —(C$_t$H$_{2t}$)OC(O)CH=CH₂, —(C$_t$H$_{2t}$)OC(O)C(CH₃)=CH₂,

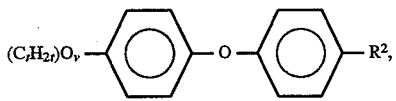

—(C$_t$H$_{2t}$)OR², —(C$_t$H$_{2t}$)OC(O)R², —(C$_t$H$_{2t}$)O( C$_t$H$_{2t}$O)$_x$H,

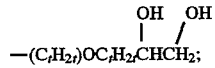

wherein Q is —OH, —OR³, —H, —Cl, —F, —Br, or 4; R² is hydrogen, an aryl group containing 6–10 carbons, or an alkyl group containing 1–4 carbons; R³ is an alkyl group containing 1–4 carbons; X is Cl, Br, F, or I; z is 0–2; x is 1–10; v is 0–1; and t is 1–4;

(c) —OCR⁴R⁵R⁶, wherein R⁴ is hydrogen, an alkyl or fluoroalkyl group containing 1–4 carbons; R⁵ is hydrogen or an alkyl group containing 1–4 carbons; and R⁶ is fluoroalkyl group containing 1–4 carbon atoms; or (d)

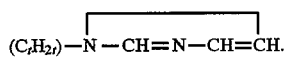

10. A method of lubricating a substrate comprising:
(a) applying to a surface of the substrate a coating if a lubricating composition comprising:

(i) about 0.1–10 weight percent of a perfluoropolyether lubricant; and
  (ii) about 99.9–90 weight percent of a liquid, perfluorinated, nonaromatic cyclic organic solvent or mixture of solvents;
(b) drying the coating to remove the perfluorinated solvent;

wherein said lubricating composition has a turbidity of less than about 30% haze.

11. The method of claim 10 wherein the solvent is a perfluorinated cyclic compound having one or two rings containing 4–7 members.

12. The method of claim 11 wherein the solvent has a boiling point of less than about 175° C.

13. The method of claim 10 wherein the perfluoropolyether lubricant contains perfluoropolyether molecules having at least one hydrogen-containing end group per molecule.

14. The method of claim 13 wherein the perfluoropolyether lubricant contains the perfluoropolyether molecules represented by the formula:

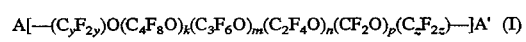

wherein:
(a) y=0–20;
(b) z=0–20;
(c) k, m, n, and p are the same or different, range from 0 to about 200, and the sum of k, m, n, and p is greater than two and typically less than about 200; and
(d) the A and A' groups are the same or different and are monovalent organic groups, wherein at least one of the A and A' groups is a hydrogen-containing monovalent organic group.

15. The method of claim 14 wherein at least one of the A and A' groups is:
(a) a —B—D group wherein:
  (i) B is: —CH₂O—, —CH₂—O—CH₂—, —CF₂— and —CF₂O—; and
  (ii) D is:

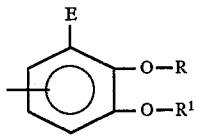

or

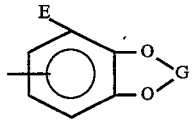

wherein, R and R¹ are alkyl groups having 1 to 3 carbon atoms; G is a divalent alkyl group having 1 to 5 carbon atoms; and E is —H, —OH, —OCH₃, —OC₂H₅, or —OC₃H₇;

(b) —(C$_t$H$_{2t}$)SH, —(C$_t$H$_{2t}$)SR², —(C$_t$H$_{2t}$)NR²₂, —CO₂R², —(C$_t$H$_{2t}$)CO₂H, —(C$_t$H$_{2t}$)SiR²$_z$Q$_{3-z}$, —(C$_t$H$_{2t}$)CN, —(C$_t$H$_{2t}$)NCO, —(C$_t$H$_{2t}$) CH=CH₂,

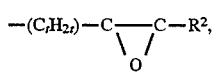

$-(C_tH_{2t})CO_2R^2$, $-(C_tH_{2t})OSO_2CF_3$, $-(C_tH_{2t})OC(O)Cl$, $-(C_tH_{2t})OCN$, $-(O)COC(O)-R^2$, $-(C_tH_{2t})X$, $-CHO$, $-(C_tH_{2t})CHO$, $-CH(OCH_3)_2$, $-(C_tH_{2t})CH(OCH_3)_2$, $-(C_tH_{2t})SO_2Cl$, $-C(OCH_3)=NH$, $-C(NH_2)=NH$, $-(C_tH_{2t})OC(O)CH=CH_2$, $-(C_tH_{2t})OC(O)C(CH_3)=CH_2$,

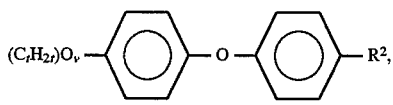

$-(C_tH_{2t})OR^2$, $-(C_tH_{2t})OC(O)R^2$, $-(C_tH_{2t})O(C_tH_{2t}O)_xH$,

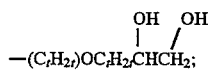

wherein Q is —OH, —$OR^3$, —H, —Cl, —F, —Br, or —I; $R^2$ is hydrogen, an aryl group containing 6–10 carbons, or an alkyl group containing 1–4 carbons; $R^3$ is an alkyl group containing 1–4 carbons; X is Cl, Br, F, or I; z is 0–2; x is 1–10; v is 0–1; and t is 1–4;

(c) —$OCR^4R^5R^6$, wherein $R^4$ is hydrogen, an alkyl or fluoroalkyl group containing 1–4 carbons; $R^5$ is hydrogen or an alkyl group containing 1–4 carbons; and $R^6$ is fluoroalkyl group containing 1–4 carbon atoms; or (d)

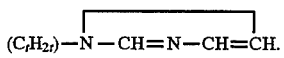

16. The method of claim 10 wherein the solvent is selected from a group consisting of 5- or 6-membered perfluorinated N-aliphatic cyclic 1,3- or 1,4-aminoethers, 5- or 6-membered perfluorinated N-aliphatic cyclic mines, perfluorinated cycloalkanes or cycloalkenes containing one or two 4-, 5-, or 6-membered rings, and mixtures thereof.

17. The method of claim 16 wherein the liquid perfluorinated solvent is selected from the group consisting of perfluoro-N-methyl morpholine, perfluoro-N-ethyl morpholine, perfluoro-N-isopropyl morpholine, perfluorodecalin, perfluorodimethylcyclobutane, perfluoro-N-methylpiperidine, perfluoro-N-methylpyrrolidine, perfluoromethylcyclohexane, perfluorocyclohexene, and mixtures thereof.

18. The method of claim 17 wherein the liquid perfluorinated solvent is selected from the group consisting of perfluoro-N-methyl morpholine, perfluoro-N-ethyl morpholine, perfluoro-N-isopropyl morpholine, and mixtures thereof.

19. The method of claim 10 wherein the perfluoropolyether lubricant is present in an amount of about 0.2–5 weight percent and the liquid, perfluorinated, nonaromatic cyclic organic solvent is present in an amount of about 99.8–95 weight percent.

20. The method of claim 10 wherein the perfluoropolyether lubricant contains perfluoropolyether molecules having two nonhydrogen-containing end groups per molecule.

* * * * *

UNITED STATES PATENT AND TRADEMARK OFFICE
CERTIFICATE OF CORRECTION

Page 1 of 2

PATENT NO. : 5,663,127
DATED : September 2, 1997
INVENTOR(S) : Richard M. Flynn and John G. Owens It is certified that error appears in the above-identified patent and that said Letters Patent is hereby corrected as shown below:

On the front page in the "Other Publications" Section, please add the following references:

--Chem. & Eng. News, Looming Ban on Production of CFC's, Halons Spurs Switch to Substitutes, pp. 12-18, November 15, 1993.
Encyclopedia of Chemical Technology, Kirk-Othmer, 3$^{rd}$ Ed., Vol. 6, Chocolate and Cocoa to Copper, John Wiley & Sons.
Evaluation of Perfluorocarbons in Precision Cleaning of Gyroscope Hardware in the Production of Inertial Instruments, p. 81, Dr. John Agopovich – Draper Laboratory, presented at the 11$^{th}$ Winter Fluorine Conference, St. Petersberg Beach, FL, 28 January 1993.
3M Performance Fluids the No Ozone-Depleting Alternative to CFC's, 3M Technical Bulletin 98-0211-6200-7, 3M Industrial Chemical Products Division.--

Col. 4, line 31, delete the section of the formula "$(C_2F_4O)_{n(CF2O)\,p}$" and insert therefor --$(C_2F_4O)_n(CF_2O)_p$--.

Col. 4, line 60, delete the word "Dalkin" and insert therefor --Daikin--.

Col. 11, line 24, delete the word "Montealison" and insert therefor --Montedison--.

Col. 13, line 44, after "-$(C_tH_{2t})O$" delete the "(" at the end of the line.

Col. 13, line 52, delete "or -I;" and insert therefore -- or |;--

Col. 15, line 18, after "-$(C_tH_{2t})O$" delete the "(" at the end of the line.

Col. 16, line 9, delete the word "mines" and insert therefore --amines--.

UNITED STATES PATENT AND TRADEMARK OFFICE
CERTIFICATE OF CORRECTION

PATENT NO. : 5,663,127
DATED : September 2, 1997
INVENTOR(S) : Richard M. Flynn and John G. Owens It is certified that error appears in the above-identified patent and that said Letters Patent is hereby corrected as shown below:

In the third reference shown above, --W.-- should be inlcuded between the words "John" and "Agopovich".

Signed and Sealed this

Twenty-ninth Day of September, 1998

*Attest:*

BRUCE LEHMAN

*Attesting Officer*    *Commissioner of Patents and Trademarks*